US011756527B1

(12) United States Patent
Richter

(10) Patent No.: US 11,756,527 B1
(45) Date of Patent: Sep. 12, 2023

(54) ASSISTED SPEECH

(71) Applicant: Apple Inc., Cupertino, CA (US)

(72) Inventor: Ian M. Richter, Los Angeles, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 16/913,278

(22) Filed: Jun. 26, 2020

Related U.S. Application Data

(60) Provisional application No. 62/867,547, filed on Jun. 27, 2019.

(51) Int. Cl.
  *G10L 13/00* (2006.01)
  *G06T 11/00* (2006.01)

(52) U.S. Cl.
  CPC ............. *G10L 13/00* (2013.01); *G06T 11/00* (2013.01)

(58) Field of Classification Search
  CPC ........... G06T 11/00; G06T 11/20; G10L 13/00
  See application file for complete search history.

(56) References Cited

U.S. PATENT DOCUMENTS

| 2003/0032484 | A1* | 2/2003 | Ohshima | A63F 13/10 463/43 |
| 2016/0077547 | A1* | 3/2016 | Aimone | A61B 5/0022 345/8 |
| 2018/0018373 | A1* | 1/2018 | Yazdian | G06F 16/24573 |
| 2019/0042908 | A1* | 2/2019 | Garcia | G06T 13/40 |
| 2019/0043472 | A1* | 2/2019 | Garcia | G10L 13/10 |
| 2019/0095775 | A1* | 3/2019 | Lembersky | G06V 40/174 |
| 2019/0204907 | A1* | 7/2019 | Xie | A63F 13/424 |
| 2020/0137001 | A1* | 4/2020 | Wu | G06F 40/216 |

* cited by examiner

*Primary Examiner* — Michelle Chin
(74) *Attorney, Agent, or Firm* — Fernando & Partners, LLP

(57) ABSTRACT

Various implementations disclosed herein include devices, systems, and methods for synthesizing virtual speech. In various implementations, a device includes a display, an audio sensor, a non-transitory memory and one or more processors coupled with the non-transitory memory. A computer-generated reality (CGR) representation of a fictional character is displayed in a CGR environment on the display. A speech input is received from a first person via the audio sensor. The speech input is modified based on one or more language characteristic values associated with the fictional character in order to generate CGR speech. The CGR speech is outputted in the CGR environment via the CGR representation of the fictional character.

27 Claims, 9 Drawing Sheets

ASSISTED SPEECH

CROSS-REFERENCE TO RELATED APPLICATION

This application claims the benefit of U.S. Provisional Patent App. No. 62/867,547, filed on Jun. 27, 2019, which is incorporated by reference in its entirety.

TECHNICAL FIELD

The present disclosure generally relates to virtual speech synthesis.

BACKGROUND

Some devices can provide images to other devices. For example, some devices include a camera that captures a video feed that is transmitted to other devices. Users of some devices transmit video captured by their devices to other devices during video calls. Being able to transmit and/or receive video data provides a better user experience than just transmitting or receiving voice data.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

Figure 1:
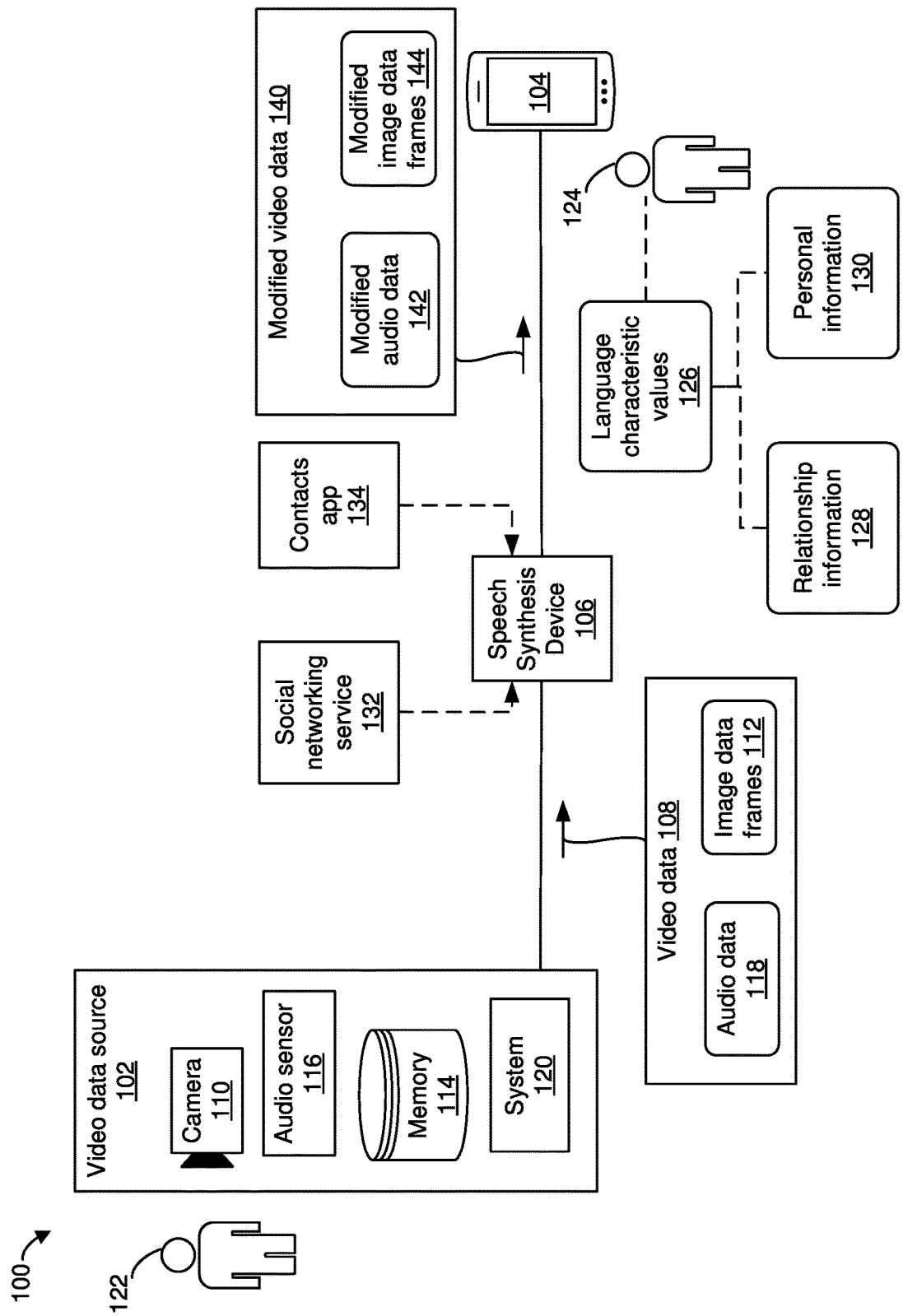
FIG. 1 illustrates an exemplary operating environment in accordance with some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method, or device. Finally, like reference numerals may be used to denote like features throughout the specification and figures.

SUMMARY

Various implementations disclosed herein include devices, systems, and methods for synthesizing virtual speech. In various implementations, a device includes a display, an audio sensor, a non-transitory memory and one or more processors coupled with the non-transitory memory. A computer-generated reality (CGR) representation of a fictional character is displayed in a CGR environment on the display. A speech input is received from a first person via the audio sensor. The speech input is modified based on one or more language characteristic values associated with the fictional character in order to generate CGR speech. The CGR speech is outputted in the CGR environment via the CGR representation of the fictional character.

In accordance with some implementations, a device includes one or more processors, a non-transitory memory, and one or more programs. In some implementations, the one or more programs are stored in the non-transitory memory and are executed by the one or more processors. In some implementations, the one or more programs include instructions for performing or causing performance of any of the methods described herein. In accordance with some implementations, a non-transitory computer readable storage medium has stored therein instructions that, when executed by one or more processors of a device, cause the device to perform or cause performance of any of the methods described herein. In accordance with some implementations, a device includes one or more processors, a non-transitory memory, and means for performing or causing performance of any of the methods described herein.

DESCRIPTION

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices, and circuits have not been described in exhaustive detail so as not to obscure more pertinent aspects of the example implementations described herein.

A physical environment refers to a physical world that people can sense and/or interact with without aid of electronic systems. Physical environments, such as a physical park, include physical articles, such as physical trees, physical buildings, and physical people. People can directly sense and/or interact with the physical environment, such as through sight, touch, hearing, taste, and smell.

In contrast, a computer-generated reality (CGR) environment refers to a wholly or partially simulated environment that people sense and/or interact with via an electronic system. In CGR, a subset of a person's physical motions, or representations thereof, are tracked, and, in response, one or more characteristics of one or more virtual objects simulated in the CGR environment are adjusted in a manner that comports with at least one law of physics. For example, a CGR system may detect a person's head turning and, in response, adjust graphical content and an acoustic field presented to the person in a manner similar to how such views and sounds would change in a physical environment. In some situations (e.g., for accessibility reasons), adjustments to characteristic(s) of virtual object(s) in a CGR environment may be made in response to representations of physical motions (e.g., vocal commands).

A person may sense and/or interact with a CGR object using any one of their senses, including sight, sound, touch, taste, and smell. For example, a person may sense and/or interact with audio objects that create 3D or spatial audio environment that provides the perception of point audio sources in 3D space. In another example, audio objects may enable audio transparency, which selectively incorporates ambient sounds from the physical environment with or without computer-generated audio. In some CGR environments, a person may sense and/or interact only with audio objects.

Examples of CGR include virtual reality and mixed reality.

A virtual reality (VR) environment refers to a simulated environment that is designed to be based entirely on computer-generated sensory inputs for one or more senses. A VR environment comprises a plurality of virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end.

In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationery with respect to the physical ground.

Examples of mixed realities include augmented reality and augmented virtuality.

An augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment.

An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof.

An augmented virtuality (AV) environment refers to a simulated environment in which a virtual or computer generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

There are many different types of electronic systems that enable a person to sense and/or interact with various CGR environments. Examples include head mounted systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mounted system may have one or more speaker(s) and an integrated opaque display. Alternatively, a head mounted system may be configured to accept an external opaque display (e.g., a smartphone). The head mounted system may incorporate one or more imaging sensors to capture images or video of the physical environment, and/or one or more microphones to capture audio of the physical environment. Rather than an opaque display, a head mounted system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one implementation, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

In some implementations, a device provides images to another device. For example, in some implementations, a device includes a camera that captures a video feed that is transmitted to other devices. A user can transmit video captured by the device to another device during a video call. The ability to transmit and/or receive video data provides a better user experience than just transmitting or receiving voice data.

In some implementations, a device synthesizes a modified version of a user's speech input, e.g., to assist the user in emulating target speech characteristics. For example, in an entertainment application, the device may assist the user in emulating speech characteristics, such as speech patterns, accents, intonations, word choices, etc. exhibited by another CGR representation in a CGR environment.

As another example, in some implementations, the device assists the user in portraying a fictional character in a fictional work, such as a television show or movie. The fictional character may be characterized by one or more language characteristic values, such as a speech pattern, an accent, an intonation, a pattern of word choices, a talking speed, etc. In some implementations, the device synthesizes a CGR representation that produces a speech output that exhibits one or more speech characteristics that are within a degree of similarity to the target speech characteristics.

The ability to interact with other people using a CGR environment enables users to have interactions with a greater number of people in a variety of contexts. For example, a CGR environment can be used to enable people to communicate with one another in casual settings or in professional settings. Participants in a CGR environment may have different backgrounds.

In a physical environment, people may adjust their speech patterns based on their audience. For example, people may use different vocabularies, intonations, inflections, etc., depending on the relationship they have with another person (e.g., supervisor, spouse, friend, parent, child, etc.) and/or one or more characteristics of the other person. People may sometimes inadvertently speak in a manner that may be inappropriate for their audience. For example, a person may inadvertently use a manner of speaking normally reserved for close friends when addressing a supervisor. The use of a CGR environment to interact with a greater number of people may make it more difficult for people to keep track of whom they are talking to and which speech patterns they should be using. Accordingly, the likelihood of using an inappropriate speech pattern may increase in a CGR environment.

The present disclosure provides methods, systems, and/or devices for modifying a speech input from a first person based on one or more language characteristics, e.g., associated with a fictional character. A CGR representation of the fictional character is displayed in a CGR environment. In some implementations, CGR speech can be generated by modifying the speech input based on a relationship between the first person and a second person (e.g., when the first person is addressing the second person via the CGR representation of the fictional character). In some implementations, the speech input is modified based on a geographical location associated with the fictional character or the second person. In some implementations, the CGR speech can be customized to the second person by inserting a name, title, honorific, or other descriptor appropriate to the second person. The CGR speech is outputted in the CGR environment via the CGR representation of the fictional character. Accordingly, CGR speech synthesis may be enhanced through the use of information relating to real-world relationships and/or language characteristics of participants in a CGR environment.

In accordance with some implementations, a device includes one or more processors, a non-transitory memory, and one or more programs. In some implementations, the one or more programs are stored in the non-transitory memory and are executed by the one or more processors. In some implementations, the one or more programs include instructions for performing or causing performance of any of the methods described herein. In accordance with some implementations, a non-transitory computer readable storage medium has stored therein instructions that, when executed by one or more processors of a device, cause the device to perform or cause performance of any of the methods described herein. In accordance with some implementations, a device includes one or more processors, a non-transitory memory, and means for performing or causing performance of any of the methods described herein.

FIG. 1 illustrates an exemplary operating environment 100 in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the operating environment 100 includes a video data source 102, a client device 104, and a speech synthesis device 106. In the example of FIG. 1, the speech synthesis device 106 is shown as being separate from the video data source 102 and the client device 104. However, in some implementations, the speech synthesis device 106 and the video data source 102 are integrated into a single device. Alternatively, in some implementations, the speech synthesis device 106 is integrated into the client device 104. In some implementations, the speech synthesis device 106 resides at (e.g., is integrated into) a server (e.g., an enterprise server that is controlled by an enterprise).

In various implementations, the video data source 102 provides video data 108 to the speech synthesis device 106. In some implementations, the video data source 102 includes a camera 110 that captures image data frames 112. In some implementations, the camera 110 is integrated into another device, such as a mobile computing device (e.g., a smartphone or a tablet). In some implementations, the video data source 102 includes a memory 114 that may store the image data frames 112.

In some implementations, an audio sensor 116, e.g., a microphone, detects user interaction inputs corresponding to sound, such as an audible signal corresponding to human speech. The audio sensor 116 receives and converts the audible signal into electronic signal data ("audio data 118", hereinafter for the sake of brevity) that can be stored in the memory 114. In some implementations, audio data 118 is captured from within an adverse acoustic environment, and thus likely includes ambient noise, interfering sounds, and background chatter in addition to a target voice of interest. In some such implementations, the video data source 102 performs a filtering operation on the audio data 118 in order to reduce the ambient noise, interfering sounds and/or background chatter.

In some implementations, the video data source 102 includes a computer-generated reality (CGR) system 120 that generates a CGR experience, of which the image data frame 112 and/or the audio data 118 may be a part. The memory 114 and/or the CGR system 120 may be integrated into the same device as the camera 110 or may be implemented in one or more other devices.

As shown in FIG. 1, in some implementations, the camera 110 and the audio sensor 116 capture the image data frames 112 and the audio data 118, respectively, from a first person 122 who is participating in a CGR session with another second person 124 represented by a CGR representation. The second person 124 may be associated with the client device 104. In some implementations, the first person is represented by a CGR representation of a fictional character.

For example, in some implementations, the first person selects the CGR representation of the fictional character as an avatar of the first person.

In some implementations, the CGR representation of the second person 124 is associated with one or more language characteristic values 126. Some language characteristic values 126 may be dependent on other persons, such as the first person 122. For example, in some implementations, the second person 124 is associated with relationship information 128 that describes a relationship between the second person 124 and the first person 122. For example, the relationship information 128 may specify that the first person 122 and the second person 124 are friends, acquaintances, family members, spouses, colleagues, in a professional relationship, and/or unknown to each other. The relationship information 128 may specify that there is a hierarchical relationship between the first person 122 and the second person 124, e.g., one of employer and employee, parent and child, teacher and student, etc.

Other language characteristic values 126 may be independent of other persons, e.g., the first person 122. For example, in some implementations, the second person 124 is associated with personal information 130 that describes the second person 124. Personal information 130 may identify the second person 124 and may include a name or title.

In some implementations, the speech synthesis device 106 receives the language characteristic values 126 and modifies speech input provided by the first person 122 (e.g., the audio data 118) based on the received language characteristic values 126. The speech synthesis device 106 can receive the language characteristic values 126 from one or more sources. For example, in some implementations, the first person 122 provides user input indicative of the language characteristic values 126. In some implementations, the second person 124 provides user input indicative of the language characteristic values 126. For example, during a meeting conducted in a CGR environment, the first person 122 and/or the second person 124 may provide personal information 130 relating to the second person 124. The first person 122 and/or the second person 124 may provide user input characterizing the nature of the relationship between the first person 122 and the second person 124.

In some implementations, the speech synthesis device 106 obtains an input indicative of language characteristic values 126 from a network or a service, such as a social networking service 132. For example, the social networking service 132 may provide information as to whether the first person 122 and the second person 124 are connected to each other via the social networking service 132 and, if so, the nature of the connection (e.g., personal, professional, etc.). In some implementations, the social networking service 132 provides an input indicative of personal information 130 relating to the second person 124. For example, the social networking service 132 may provide information relating to the geographic location of the second person 124.

In some implementations, the speech synthesis device 106 obtains an input indicative of language characteristic values 126 from a database or an application installed on a device associated with the first person 122, such as a contacts application 134. For example, the contacts application 134 may provide information as to whether the second person 124 is known to the first person 122 and, if so, the relationship between the first person 122 and the second person 124 (e.g., personal, professional, etc.). In some implementations, the contacts application 134 provides an input indicative of personal information 130 relating to the second person 124.

For example, the contacts application 134 may provide information relating to the geographic location of the second person 124.

In various implementations, the speech synthesis device 106 modifies the video data 108 in order to generate modified video data 140. In some implementations, the speech synthesis device 106 modifies the audio data 118 to generate modified audio data 142. The speech synthesis device 106 modifies the audio data 118 based on the language characteristic values 126 relating to the second person 124, as disclosed herein. In some implementations, the speech synthesis device 106 modifies the audio data 118 based on the relationship between the first person 122 and the second person 124. The speech synthesis device 106 may insert a name, title, or honorific identifying the second person 124.

In some implementations, the speech synthesis device 106 modifies the image data frames 112 to generate modified image data frames 144. For example, in some implementations, the speech synthesis device 106 may modify the image data frames 112 such that apparent movements, e.g., of the mouth and other facial features of the CGR representation 201 of the first person 122 are consistent with the modified audio data 142.

In some implementations, the modified image data frames 144 include pixels corresponding to a CGR representation of a fictional character in a fictional work, such as a television show or a movie. The fictional character may be characterized by one or more target speech characteristics, such as a speech pattern, an accent, an intonation, a pattern of word choices, etc. In some implementations, the speech synthesis device 106 modifies the audio data based on the target speech characteristics of the fictional character to synthesize a speech output that exhibits one or more speech characteristics that are within a similarity threshold of the target speech characteristics. In some implementations, apparent movements of the mouth and other facial features of the CGR representation of the fictional character are consistent with the modified audio data 142.

In some implementations, the modified image data frames 144 include pixels corresponding to an indication that the speech input has been modified based on the target speech characteristics of the fictional character. The indication may specify a type of modification that has been made to the speech input. In some implementations, the indication may specify the speech input, e.g., the unmodified speech input.

In some implementations, a device of the second person displays an option to turn off modifications to speech of the first person. In such implementations, if the second person turns off the modifications, then the second person hears the speech input from the first person with no modifications applied to the speech input.

In various implementations, the client device 104 includes a mobile computing device (e.g., a smartphone, a tablet, or a laptop), a desktop, a television, and/or a CGR device (e.g., a head-mountable device (HMD) such as a CGR headset). In some implementations, head-mountable devices (HMDs), being worn by the first person 122 and the second person 124, respectively, present (e.g., display) the CGR environment according to various implementations. In some implementations, at least one of the HMDs includes an integrated display (e.g., a built-in display) that displays the CGR environment. In some implementations, at least one of the HMDs includes a head-mountable enclosure. In various implementations, the head-mountable enclosure includes an attachment region to which another device with a display can be attached. For example, in some implementations, the client device 104 can be attached to the head-mountable enclosure. In various implementations, the head-mountable enclosure is shaped to form a receptacle for receiving another device that includes a display (e.g., the client device 104). For example, in some implementations, the client device 104 slides/snaps into or otherwise attaches to the head-mountable enclosure. In some implementations, the display of the device attached to the head-mountable enclosure presents (e.g., displays) the CGR environment. In various implementations, examples of the client device 104 include smartphones, tablets, media players, laptops, etc.

In various implementations, the speech synthesis device 106 allows the video data source 102 to provide the video data 108 while reducing the likelihood that video data including inappropriate speech patterns or speech patterns that breach a threshold will be inadvertently delivered to a participant in a CGR environment. In various implementations, the speech synthesis device 106 may enhance CGR speech synthesis by using information relating to real-world relationships and/or language characteristics of participants in a CGR environment.

Figure 2A:
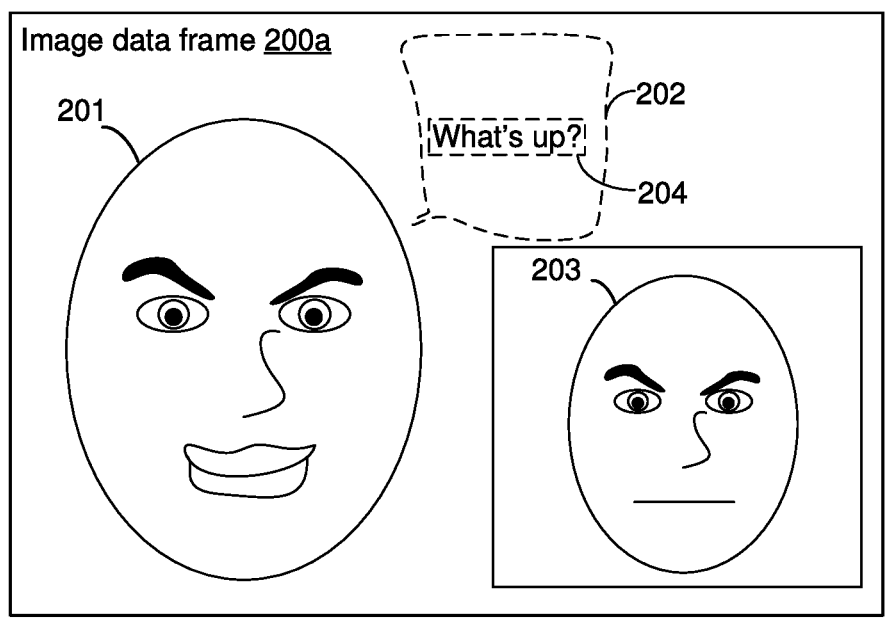
FIGS. 2A-2H are diagrams of example image data frames in accordance with some implementations.

FIG. 2A illustrates example video data, e.g., an example image data frame 200a. The example image data frame 200a may be captured by a device, such as a device associated with the video data source 102. The image data frame 200a includes pixels corresponding to a CGR representation 201 of a first person associated with the video data source 102, such as the first person 122. The image data frame 200a includes pixels that represent a second CGR representation 203 of a second person, such as the second person 124. In some implementations, the CGR representation 201 is of a fictional character. In such implementations, the CGR representation 201 of the fictional character manipulated based on facial expressions of the first person.

In some implementations, the video data source 102 (e.g., the audio sensor 116) captures a speech input 202 from the first person 122. For example, the first person 122 may say, "What's up?" to greet the second person 124. The dashed lines in FIG. 2A indicate that the speech input 202 may or may not be displayed in the image data frame 200a. The speech input 202 may include a phrase 204, which may include one word (e.g., "'Sup?") or multiple words (e.g., "What's up?").

In some implementations, the speech synthesis device 106 determines that the speech input satisfies a threshold, e.g., an appropriateness threshold that is a function of the language characteristic values and does not modify the speech input 202. For example, in some implementations, the speech synthesis device 106 determines that the speech input is within a similarity threshold of a greeting that the fictional character uses to greet people in the fictional work. In some implementations, the speech synthesis device 106 modifies the speech input 202 based on one or more language characteristic values associated with the second person 124 to generate a CGR speech output.

Figure 2B:
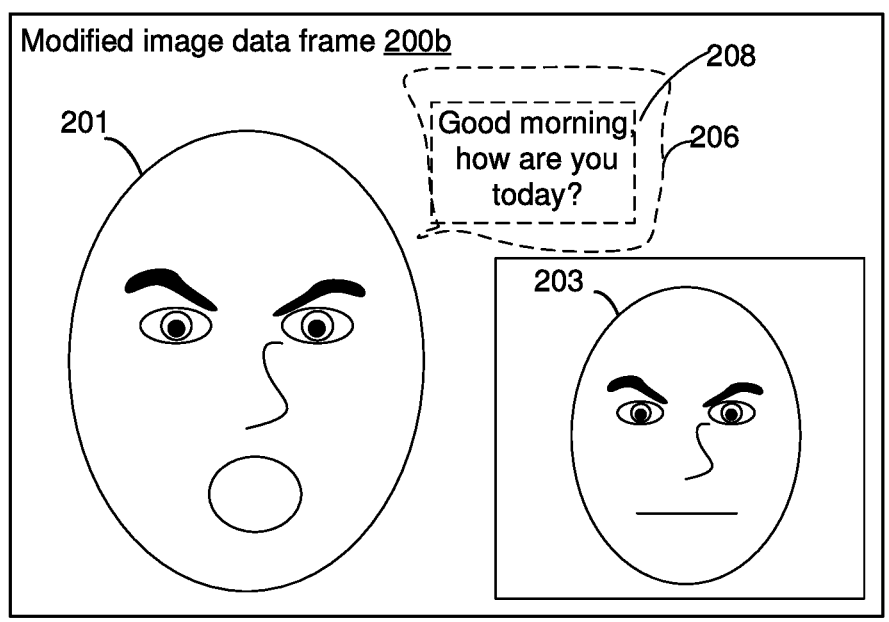

FIG. 2B illustrates example modified video data that may be generated by the speech synthesis device 106. The modified video data includes a modified image data frame 200b and/or modified audio data. In some implementations, the speech synthesis device 106 modifies the speech input 202 based on a collegial relationship between the first person 122 and the second person 124 (e.g., in order to match how the fictional character addresses people with the same collegial relationship). For example, if the second person 124 is a supervisor of the first person 122, the speech synthesis device 106 may generate a CGR speech output 206 that replaces the phrase 204 with a replacement phrase 208 that satisfies the threshold or the language characteristic values when addressing a supervisor, e.g., "Good morning, how are you today?" In some implementations, the replacement phrase 208 is used by the fictional character to address a supervisor of the fictional character in the fictional work. The tone of the speech input 202 may be modified. For example, the speech synthesis device 106 may modify the tone of the speech input 202 so that the CGR speech output 206 has a more deferential tone than the speech input 202 when the second person 124 is a supervisor of the first person 122. The speech synthesis device 106 generates modified audio data representative of the CGR speech output 206. In some implementations, the speech synthesis device 106 generates the modified image data frame 200b to be consistent with the CGR speech output 206, e.g., with movement of facial features that is consistent with the replacement phrase 208. The dashed lines in FIG. 2B indicate that the CGR speech output 208 may or may not be displayed in the image data frame 200b.

Figure 2C:
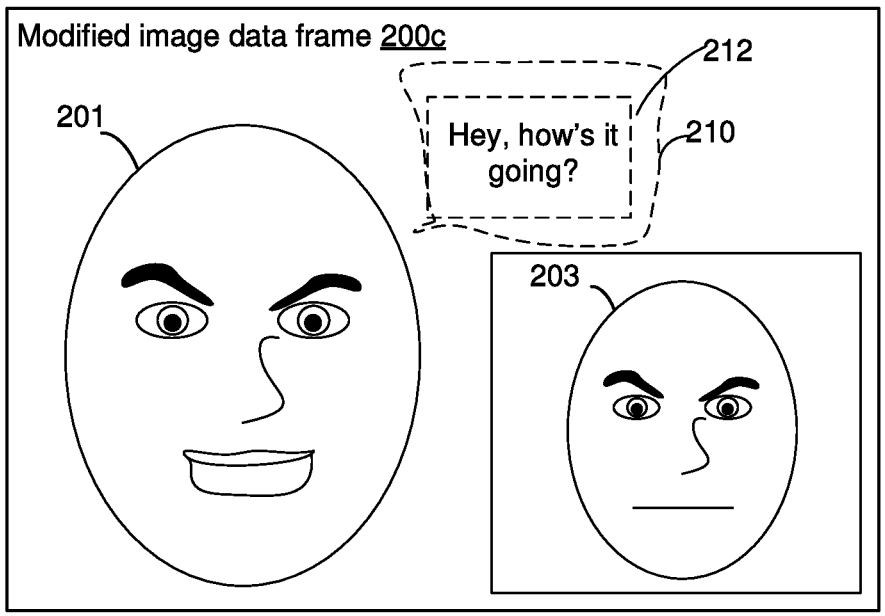

FIG. 2C illustrates another example of modified video data that may be generated by the speech synthesis device 106. The modified video data includes a modified image data frame 200c and/or modified audio data. In some implementations, the speech synthesis device 106 modifies the speech input 202 based on a collegial relationship between the first person 122 and the second person 124 (e.g., in order to match how the fictional character addresses people with the same collegial relationship). For example, if the second person 124 is a colleague of the first person 122, the speech synthesis device 106 may generate a CGR speech output 210 that replaces the phrase 204 with a replacement phrase 212 that satisfies the language characteristic values corresponding to a colleague, e.g., "How's it going?" In some implementations, the replacement phrase 212 is used by the fictional character to address a colleague of the fictional character in the fictional work. The speech synthesis device 106 may modify the tone of the speech input 202 so that the CGR speech output 206 has a professional tone when the second person 124 is a colleague of the first person 122. The speech synthesis device 106 generates modified audio data representative of the CGR speech output 212. In some implementations, the speech synthesis device 106 generates the modified image data frame 200c to be consistent with the CGR speech output 210, e.g., with movement of facial features that is consistent with the replacement phrase 212. The dashed lines in FIG. 2C indicate that the CGR speech output 210 may or may not be displayed in the modified image data frame 200c.

Figure 2D:
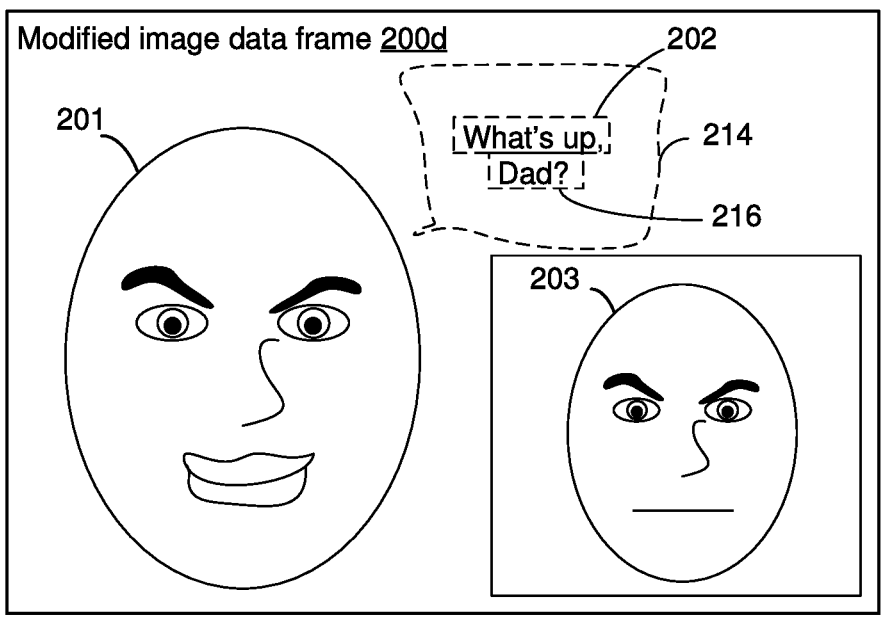

FIG. 2D illustrates another example of modified video data that may be generated by the speech synthesis device 106. The modified video data includes a modified image data frame 200d and/or modified audio data. In some implementations, the speech synthesis device 106 modifies the speech input 202 based on a familial relationship between the first person 122 and the second person 124 to generate a CGR speech output 214 (e.g., in order to match how the fictional character addresses people with the same familial relationship). If the first person 122 and the second person 124 have a close familial relationship, for example, the speech synthesis device 106 may select informal phrasing (e.g., keeping the phrasing "What's up?"). The speech synthesis device 106 may insert an informal honorific 216 (e.g., "Dad") corresponding to the relationship between the first person 122 and the second person 124. In some implementations, the informal honorific 216 is used by the fictional character to address a close family member of the fictional character in the fictional work. The tone of the speech input 202 may be modified. For example, the speech synthesis device 106 may modify the tone of the speech input 202 so that the CGR speech output 214 has an informal tone when the first person 122 and the second person 124 have a close familial relationship. The speech synthesis device 106 generates modified audio data representative of the CGR speech output 214. In some implementations, the speech synthesis device 106 generates the modified image data frame 200d to be consistent with the CGR speech output 214. The dashed lines in FIG. 2D indicate that the CGR speech output 214 may or may not be displayed in the modified image data frame 200d.

Figure 2E:
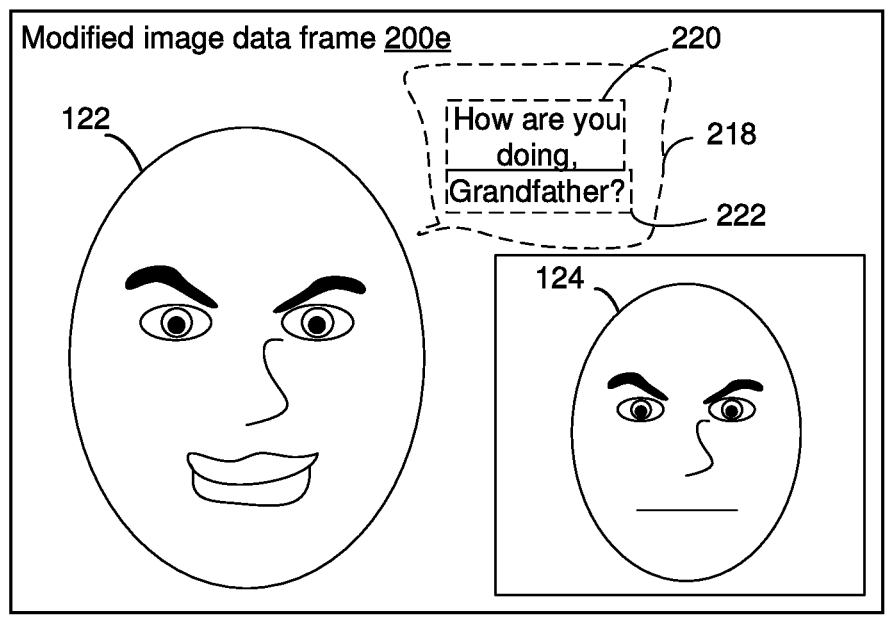

FIG. 2E illustrates another example of modified video data that may be generated by the speech synthesis device 106. The modified video data includes a modified image data frame 200e and/or modified audio data. In some implementations, the speech synthesis device 106 modifies the speech input 202 based on a familial relationship between the first person 122 and the second person 124 to generate a CGR speech output 218. If the first person 122 and the second person 124 have a distant familial relationship, for example, the speech synthesis device 106 may select a formal phrase 220 (e.g., "How are you doing?"). In some implementations, the formal phrase 220 is used by the fictional character to address a distant family member of the fictional character in the fictional work. The speech synthesis device 106 may insert a formal honorific 222 (e.g., "Grandfather") corresponding to the relationship between the first person 122 and the second person 124. In some implementations, the formal honorific 222 is used by the fictional character to address a distant family member of the fictional character in the fictional work. The tone of the speech input 202 may be modified. For example, the speech synthesis device 106 may modify the tone of the speech input 202 so that the CGR speech output 218 has a formal tone when the first person 122 and the second person 124 have a distant familial relationship (e.g., if the fictional character uses a formal tone when talking with other fictional characters with whom the fictional character has a distant familial relationship). As another example, the speech synthesis device 106 may modify the tone of the speech input 202 so that the CGR speech output 218 has a respectful or deferential tone when the second person 124 is an elder relative to the first person 122 (e.g., if the fictional character uses a respectful or deferential tone when speaking with other fictional characters that are older relatives of the fictional character). The speech synthesis device 106 generates modified audio data representative of the CGR speech output 218. In some implementations, the speech synthesis device 106 generates the modified image data frame 200e to be consistent with the CGR speech output 218. The dashed lines in FIG. 2E indicate that the CGR speech output 218 may or may not be displayed in the modified image data frame 200e.

Figure 2F:
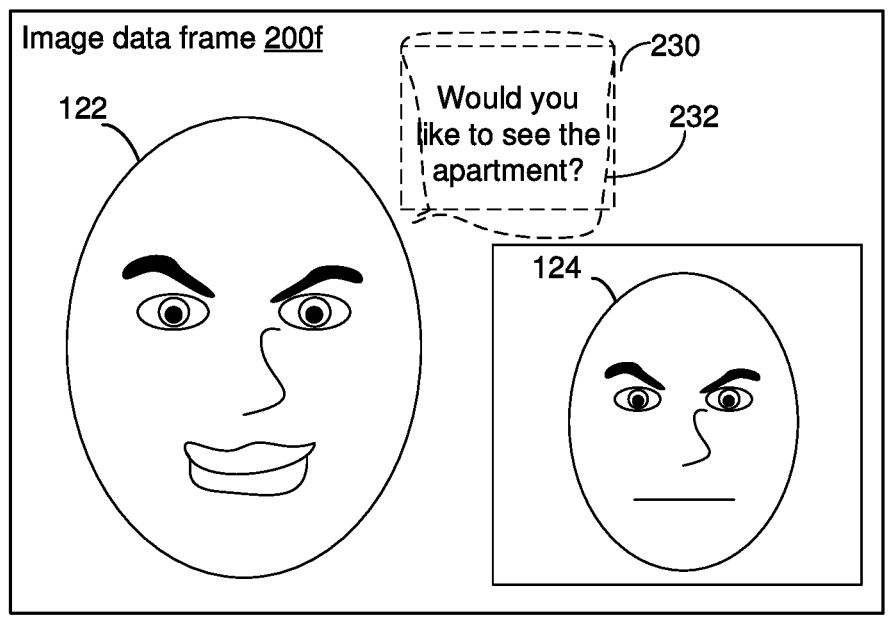

FIG. 2F illustrates another example of video data, e.g., an example image data frame 200f. The example image data frame 200f may be captured by a device, such as a device associated with the video data source 102. The image data frame 200f includes pixels corresponding to a CGR representation of a first person associated with the video data source 102, such as the first person 122. The image data frame 200f includes pixels that represent a second CGR representation of a second person, such as the second person 124.

In some implementations, the video data source 102 (e.g., the audio sensor 116) captures a speech input 230 from the first person 122. For example, the first person 122 may say, "What's up?" to greet the second person 124. The dashed lines in FIG. 2F indicate that the speech input 230 may or may not be displayed in the image data frame 200f. The speech input 230 may include a phrase 232, e.g., "Would you like to see the apartment?"

Figure 2G:
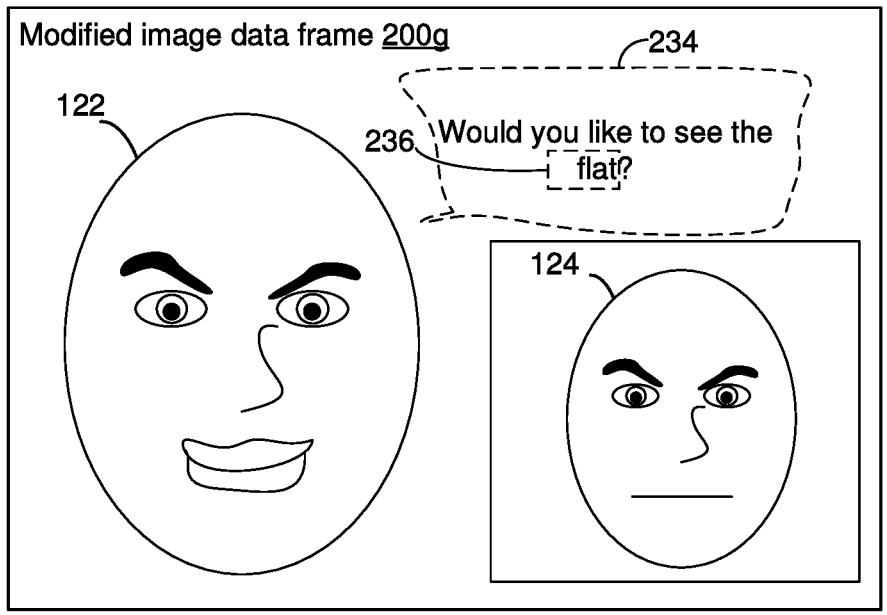

FIG. 2G illustrates example modified video data that may be generated by the speech synthesis device 106. The modified video data includes a modified image data frame 200g and/or modified audio data. In some implementations, the speech synthesis device 106 modifies the speech input 230 based on a geographical relationship between the first person 122 and the second person 124. For example, if the second person 124 is based in the United Kingdom, the speech synthesis device 106 may generate a CGR speech output 234 that replaces a word (e.g., "apartment") in the phrase 232 with a replacement word 236 with which the second person 124 may be more familiar (e.g., "flat"). In some implementations, the fictional character uses the replacement work 236 when addressing other fictional characters that are associated with the geographical location of the second person (e.g., the fictional character uses the word "flat" instead of "apartment" when speaking with other fictional characters that are from the United Kingdom). The tone of the speech input 230 may be modified. For example, the speech synthesis device 106 may modify the tone of the speech input 230 so that the CGR speech output 234 has an inflection that is typical of speakers of British English (e.g., if the fictional character uses a British accent when speaking with other fictional characters that are British). The speech synthesis device 106 generates modified audio data representative of the CGR speech output 234. In some implementations, the speech synthesis device 106 generates the modified image data frame 200g to be consistent with the CGR speech output 234, e.g., with movement of facial features that is consistent with the replacement word 236. The dashed lines in FIG. 2G indicate that the CGR speech output 234 may or may not be displayed in the modified image data frame 200g.

Figure 2H:
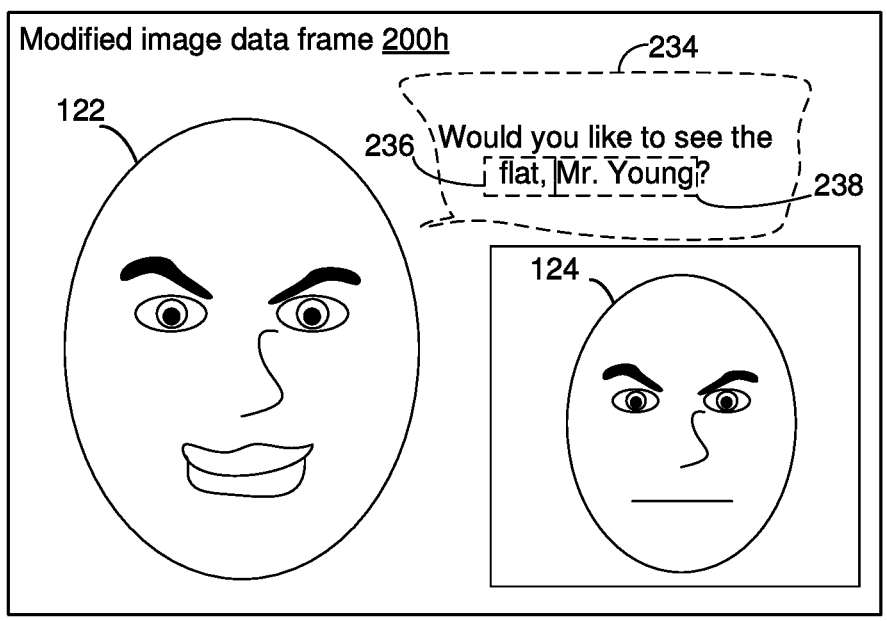

FIG. 2H illustrates another example of modified video data that may be generated by the speech synthesis device 106. The modified video data includes a modified image data frame 200h and/or modified audio data. In some implementations, the speech synthesis device 106 modifies the speech input 230 based on a geographical relationship between the first person 122 and the second person 124. In the example shown in FIG. 2H, in addition to replacing the word "apartment" in the phrase 232 with the replacement word 236 (e.g., "flat"), the speech synthesis device 106 also inserts an identifier 238 that identifies the second person 124, e.g., "Mr. Young." In some implementations, the speech synthesis device 106 inserts the identifier 238 if the fictional character uses the identifier 238 when speaking with other fictional characters. The identifier 238 may include one or more of a title, a prefix, a given name, one or more middle names, a surname, and/or one or more suffixes. The speech synthesis device 106 generates modified audio data representative of the CGR speech output 234. In some implementations, the speech synthesis device 106 generates the modified image data frame 200h to be consistent with the CGR speech output 234, e.g., with movement of facial features that is consistent with the replacement word 236 and the added identifier 238. The dashed lines in FIG. 2H indicate that the CGR speech output 234 may or may not be displayed in the image data frame 200h.

Figure 3:
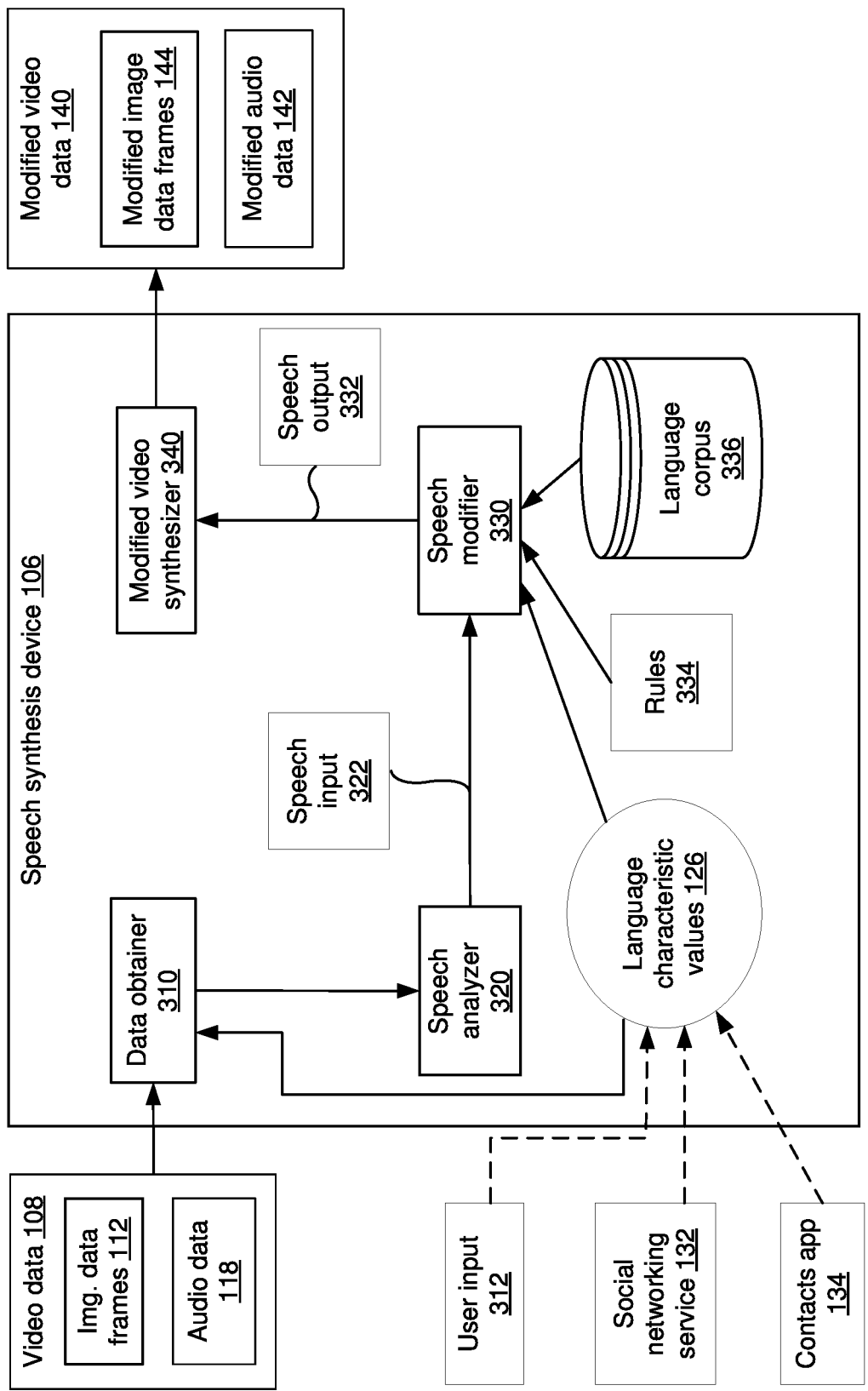
FIG. 3 is a block diagram of an example filtering device in accordance with some implementations.

FIG. 3 illustrates the speech synthesis device 106 in accordance with some implementations. In some implementations, the speech synthesis device 106 includes a data obtainer 310, a speech analyzer 320, a speech modifier 330, and a modified video synthesizer 340. In various implementations, the data obtainer 310 obtains the video data 108. The video data 108 may include the image data frames 112 and/or the audio data 118. In some implementations, the data obtainer 310 receives the image data frames 112 and/or the audio data 118, for example, from the video data source 102 shown in FIG. 1 (e.g., the camera 110 and/or the audio sensor 116). In some implementations, the data obtainer 310 obtains a video feed and extracts the image data frames 112 from the video feed.

In some implementations, the data obtainer 310 obtains one or more language characteristic values 126, e.g., associated with a fictional character. The one or more language characteristic values 126 may include the relationship information 128 and/or the personal information of FIG. 1. In some implementations, the data obtainer 310 obtains the one or more language characteristic values 126 from one or more sources. For example, in some implementations, the first person 122 and/or the second person 124 provide user input 312 indicative of the one or more language characteristic values 126. In some implementations, the data obtainer 310 obtains an input indicative of the one or more language characteristic values 126 from the social networking service 132. For example, the social networking service 132 may provide information as to whether the first person 122 and the second person 124 are connected to each other via the social networking service 132 and, if so, the nature of the connection (e.g., personal, professional, etc.). In some implementations, the social networking service 132 provides an input indicative of personal information 130 relating to the second person 124. In some implementations, the data obtainer 310 obtains the one or more language characteristic values 126 from a fictional work depicting the fictional character.

In some implementations, the data obtainer 310 obtains an input indicative of language characteristic values 126 from the contacts application 134. For example, the contacts application 134 may provide information as to whether the second person 124 is known to the first person 122 and, if so, the relationship between the first person 122 and the second person 124 (e.g., personal, professional, etc.). In some implementations, the contacts application 134 provides an input indicative of personal information 130 relating to the second person 124.

In various implementations, the speech analyzer 320 analyzes the audio data 118 obtained by the data obtainer 310. The audio data 118 may include ambient noise, interfering sounds, and background chatter in addition to a target voice of interest. The speech analyzer 320 may apply signal processing techniques to extract sounds corresponding to a speech input 322 from other sounds. In some implementations, the speech analyzer 320 performs speech recognition to parse the speech input 322 into phrases. In some implementations, the speech analyzer 320 characterizes aspects of the speech input 322, such as tonal qualities, inflection, rate of speech, etc.

In various implementations, the speech modifier 330 modifies the speech input 322 based on the one or more language characteristic values 126 to generate CGR speech output 332. For example, the speech modifier 330 may add a phrase to the speech input 322 or delete a phrase from the speech input 322. For example, the speech modifier 330 may add words to the speech input 322 to match the speaking style of a fictional character. As another example, the speech modifier 330 may remove filler words (e.g., "um" and "er") from the speech input 322 to match the speaking style of a fictional character. In some implementations, the speech modifier 330 may replace a phrase in the speech input 322 with a replacement phrase.

In some implementations, the speech modifier 330 determines which phrase or phrases should be added to, deleted from, or replaced in the speech input 322 by applying rules 334 to the language characteristic values 126. For example, a rule 334 may specify that if the language characteristic values 126 indicate that the second person 124 is in a supervisory role relative to the first person 122, phrases in the speech input 322 that are characterized as informal or casual should be replaced with phrases that are formal. Another rule 334 may specify that if the language characteristic values 126 indicate that the second person 124 is in a supervisory role relative to the first person 122, titles or honorifics connoting respect (e.g., "Sir," "Ms. Lee," "Mr. President") should be inserted into the speech input. In some implementations, the rules 334 are generated based on interactions between the fictional character and other fictional characters in the fictional work. For example, the rules are extracted from conversations between the fictional character and other fictional characters.

Some rules may specify that phrases should be deleted from the speech input 322 based on the language characteristic values. For example, a rule 334 may specify that if the language characteristic values 126 indicate that the second person 124 is in a supervisory role relative to the first person 122, certain phrases (e.g., profanity or other potentially offensive phrases) should be deleted from the speech input 322.

In some implementations, the speech modifier 330 uses a language corpus 336 to obtain supplemental or replacement phrases to insert in the CGR speech output 332 consistent with the rules 334. The language corpus 336 may be stored in a memory and may include phrases and corresponding metadata. In some implementations, the metadata associates the phrases with characteristics such as formality level (e.g., formal vs. casual), geographic area (e.g., United Kingdom, Southern United States, Midwestern United States), related phrases (e.g., "flat" is synonymous with and can replace "apartment"), etc.

In some implementations, the speech modifier 330 modifies aspects of the speech input 322, such as tonal qualities, amplitude, inflection, accent, rate of speech, etc., based on the language characteristic values 126. For example, if the language characteristic values 126 indicate (e.g., the relationship information 128 indicates) that the second person 124 is in a supervisory role relative to the first person 122, the speech modifier 330 may modify the speech input 322 to have a respectful or deferential tone (e.g., in response to determining that the fictional character uses a respectful or deferential tone when addressing another fictional character that is a supervisor). As yet another example, in some implementations, the speech modifier 330 may modify the inflection and/or rate of speech of the speech input 322 to fit patterns that are representative of speakers from a geographical area associated with a fictional character and/or the second person 124, as indicated by the personal information 130.

In some implementations, the speech modifier 330 modifies the amplitude of the speech input 322 to match a speaking style of a fictional character. For example, if the fictional character is a loud speaker, the speech modifier 330 may increase the amplitude of the speech input 322. If the fictional character is a soft speaker, the speech modifier 330 may decrease the amplitude of the speech input 322.

In some implementations, the speech modifier 330 modifies the pitch of the speech input 322 to match a speaking style of a fictional character. For example, if the fictional character has a deep voice, the speech modifier 330 may decrease the pitch of the speech input 322. If the fictional character has a high-pitched voice, the speech modifier 330 may increase the pitch of the speech input 322.

In some implementations, the speech modifier 330 modifies the speed of the speech input 322 to match a speaking style of a fictional character. For example, if the fictional character is a fast speaker, the speech modifier 330 may increase the speed of the speech input 322. If the fictional character is a slow speaker, the speech modifier 330 may decrease the speed of the speech input 322.

In various implementations, the modified video synthesizer 340 synthesizes the modified video data 140 based on the CGR speech output 332. The modified video data includes modified audio data 142 and modified image data frames 144. In some implementations, the speech modifier 330 modifies the speech input 322 to generate the CGR speech output 332. The modified video synthesizer 340 converts the CGR speech output 332 to an audio signal that may be encoded as the modified audio data 142. In some implementations, the modified video synthesizer 340 modifies the image data frames 112 to generate the modified image data frames 144. For example, in some implementations, the modified video synthesizer 340 modifies the pixels representing the facial features of the first person 122 so that the apparent movements of the facial features of the first person 122 are consistent with the phrases in the CGR speech output 332. As another example, in some implementations, the modified video synthesizer 340 may modify the pixels in the image data frames 112 so that text corresponding to the CGR speech output 332 (e.g., captioning) appears in the modified image data frames 144.

Figure 4A:
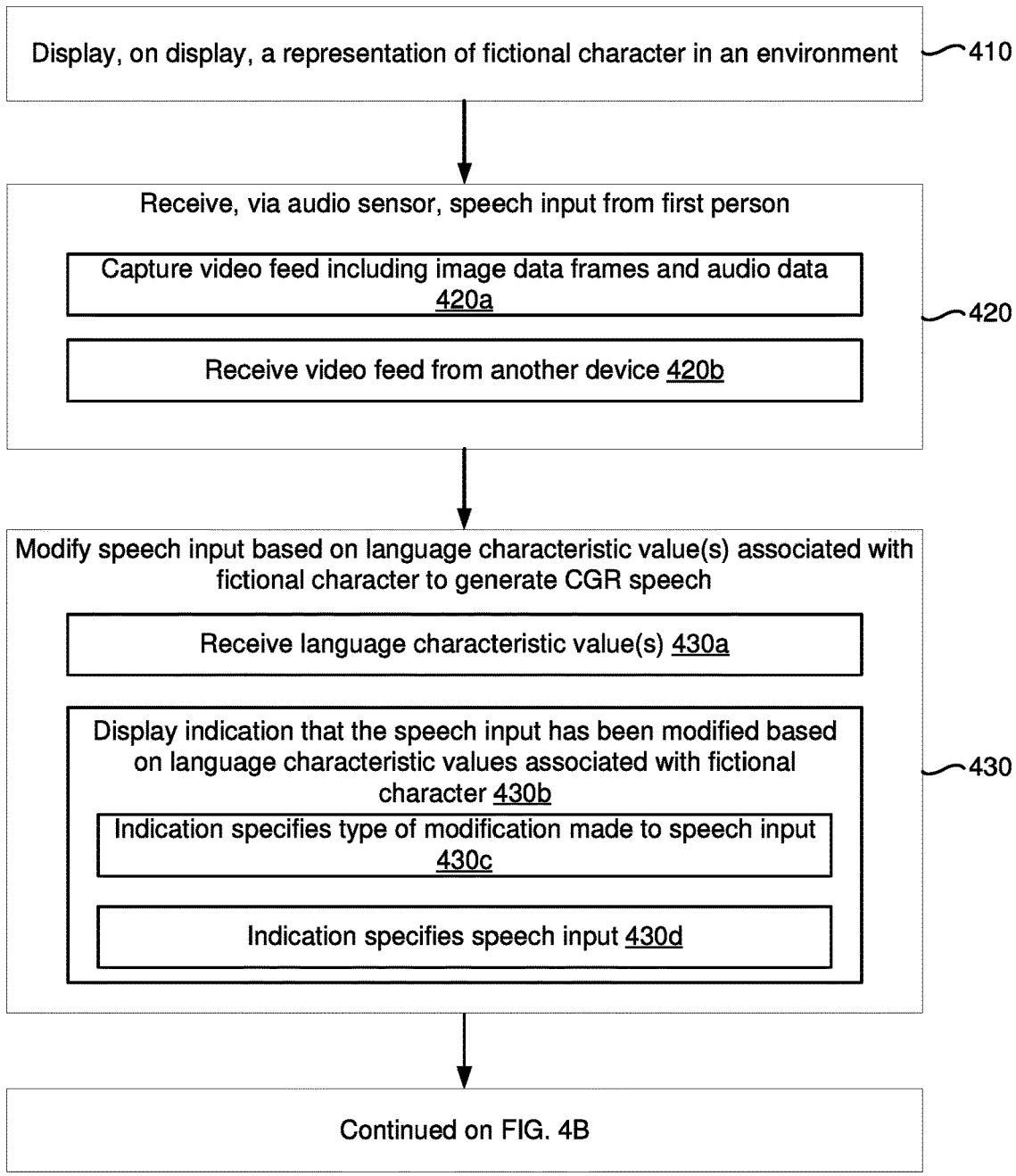
FIGS. 4A and 4B are flowchart representations of a method of synthesizing virtual speech in accordance with some implementations.
Figure 4B:
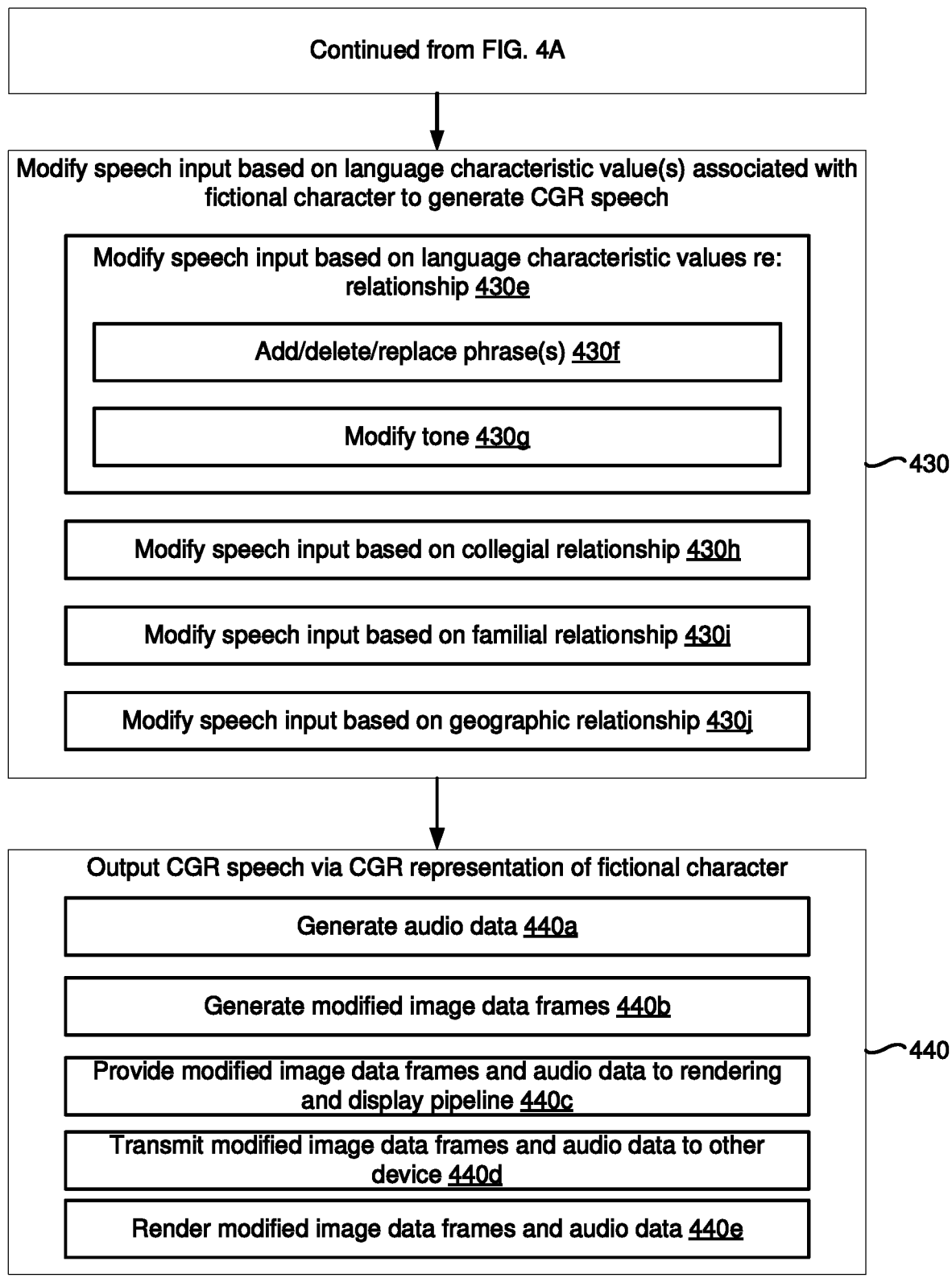

FIGS. 4A and 4B are a flowchart representation of a method 400 for generating virtual speech in accordance with some implementations. In various implementations, the method 400 is performed by a device (e.g., the speech synthesis device 106 shown in FIGS. 1 and 3). In some implementations, the method 400 is performed by processing logic, including hardware, firmware, software, or a combination thereof. In some implementations, the method 400 is performed by a processor executing code stored in a non-transitory computer-readable medium (e.g., a memory). Briefly, in various implementations, the method 400 includes displaying, on a display, a computer-generated reality (CGR) representation of a fictional character in a CGR environment, receiving, via an audio sensor, a speech input from a first person, modifying the speech input based on one or more language characteristic values associated with the fictional character to generate CGR speech, and outputting the CGR speech in the CGR environment via the CGR representation of the fictional character.

As represented by block 410, in various implementations, the method 400 includes displaying, on a display, a CGR representation of a fictional character in a CGR environment. In some implementations, the fictional character is associated with one or more language characteristic values, e.g., the language characteristic values 126 shown in FIG. 1. In some implementations, the one or more language characteristic values indicate the relationship between the first person and a second person. For example, the one or more language characteristic values may indicate whether the first person and the second person have a familial relationship, a social relationship, a professional relationship, and/or a collegial relationship. The one or more language characteristic values may indicate whether the first person and the second person are in a hierarchical relationship, e.g., one of employer and employee, parent and child, teacher and student, etc.

In some implementations, the one or more language characteristic values indicate characteristics of the second person that may be independent of the first person. For example, the one or more language characteristic values may indicate a location of the second person.

In some implementations, the one or more language characteristic values indicate characteristics of a fictional character that is represented by the second representation. For example, the one or more language characteristic values may indicate a location associated with the fictional character. The one or more language characteristic values may indicate an age of the fictional character.

As represented by block 420, in some implementations, the method 400 includes receiving, via an audio sensor, a speech input from a first person. The speech input may be captured, for example, by the video data source 102 (e.g., the audio sensor 116). As represented by block 420a, in some implementations, the method 400 includes capturing a video feed that includes image data frames and audio data. For example, in some implementations, a video frame is extracted from a video. The video feed may be captured using the camera 110 and the audio sensor 116. In some implementations, the video is a pre-recorded video. Alternatively, in some implementations, the video is a live video (e.g., a livestream).

In some implementations, as represented by block 420b, the method 400 includes receiving a video feed from another device. For example, as shown in FIG. 1, in some implementations, the method 400 includes receiving a video feed from the memory 114 or the CGR system 120. Audio data may be extracted from the video feed.

As represented by block 430, in various implementations, the method 400 includes modifying the speech input based on one or more language characteristic values associated with the fictional character in order to generate CGR speech. As represented by block 430a, the method 400 includes receiving the one or more language characteristic values. The one or more language characteristic values may be received from any of a variety of sources, including, for example, user input from the first person and/or the second person, a social networking service, and/or a contacts application. In some implementations, the method 400 includes extracting the one or more language characteristic values from a fictional work depicting the fictional character. For example, if the fictional character is from a movie, the method 400 includes performing scene analysis on at least a portion of the movie (e.g., portions of the movie in which the fictional character has dialogues) to extract the one or more language characteristic values.

In some implementations, as represented by block 430b, the method 400 includes displaying an indication that the speech input has been modified based on the one or more language characteristic values associated with the fictional character. For example, the modified image data frames may include modified pixels corresponding to a notification that the speech input has been modified. As represented by block 430c, the indication may specify a type of modification that has been made to the speech input. For example, the indication may specify whether words have been added to or deleted from the speech input. In some implementations, as represented by block 430d, the indication specifies the speech input. For example, the indication may provide a transcription of the original speech input. In some implementations, the indication includes specifying a name of the fictional character that the first person is portraying (e.g., speaking like the fictional character John Appleseed from a fictional movie named ABC).

Referring to FIG. 4B, as represented by block 430e, in some implementations, the method 400 includes modifying the speech input based on a relationship between the first person and the second person (e.g., based on one or more language characteristic values that indicate a relationship between the first person and the second person). In some implementations, as represented by block 430f, one or more phrases (e.g., of one or more words) may be added to, deleted from, or replaced in the speech input based on one or more language characteristic values that indicate the relationship between the first person and the second person.

In some implementations, as represented by block 430g, the tone of the speech input may be modified based on one or more language characteristic values that indicate the relationship between the first person and the second person. For example, if the one or more language characteristic values indicate that the second person is a supervisor, teacher, or parent of the first person, the speech input may be modified to have a more respectful or deferential tone (e.g., in order to match how the fictional character addresses his/her supervisor, teacher or parent). If the one or more language characteristic values indicate that the second person is a friend of the first person, the speech input may be modified to have a casual tone (e.g., in order to match how the fictional character addresses his/her friend).

As represented by block 430h, in some implementations, the method 400 includes modifying the speech input based on a collegial relationship between the first person and the second person (e.g., in order to match how the fictional character addresses a colleague). For example, if the second person is a supervisor of the first person, the phrase "What's up?" may be replaced with a replacement phrase that is more appropriate for use when addressing a supervisor, e.g., "Good morning, how are you today?" The tone of the speech input may be modified to have a more respectful deferential tone. As another example, if the second person is a colleague of the first person, the phrase "What's up?" may be replaced with a replacement phrase that is still professional, but less formal, e.g., "How is it going?" The tone of the speech input may be modified so that the CGR speech output has a professional but not deferential tone when the second person is a colleague of the first person.

As represented by block 430i, in some implementations, the method 400 includes modifying the speech input based on a familial relationship between the first person and the second person (e.g., in order to match how the fictional character speaks with a family member). For example, if the first person and the second person have a close familial relationship, informal phrasing (e.g., "What's up?") may be used. In some implementations, an informal honorific (e.g., "Dad") corresponding to the relationship between the first person and the second person may be inserted. The tone of the speech input may be modified (e.g., to have an informal tone in the case of a close familial relationship). As another example, if the first person and the second person have a more distant familial relationship, a more formal phrasing (e.g., "How are you doing?") and tone may be used. In some implementations, a formal honorific (e.g., "Grandfather") corresponding to the relationship between the first person and the second person may be inserted.

As represented by block 430j, in some implementations, the method 400 includes modifying the speech input based on a geographic relationship between the first person and the second person (e.g., in order to match how the fictional character speaks with other fictional characters with whom the fictional character has the same geographical relationship as the geographical relationship between the first and second persons). For example, if the second person is based in the United Kingdom, a word (e.g., "apartment") that is specific to the geographic area (e.g., the United States of America) associated with the first person may be replaced with a replacement word that is specific to the geographic area (e.g., the United Kingdom) associated with the second person (e.g., "flat"). The speech input may be modified, e.g., to have a British inflection and accent.

As represented by block 440, in some implementations, the method 400 includes outputting the CGR speech in the CGR environment via the CGR representation of the fictional character. As represented by block 440a, in some implementations, audio data corresponding to the CGR speech is generated. The audio data may be identical or similar to the audio data corresponding to the speech input if the speech input is unmodified. In some implementations, the audio data is modified relative to the audio data corresponding to the speech input, e.g., if the speech input is modified to generate the CGR speech. In various implementations, the method 400 allows the first person to imitate a speaking style of the fictional character.

As represented by block 440b, in some implementations, modified image data frames are generated. The modified image data frames may be generated to be consistent with the CGR speech. For example, in some implementations, the modified image data frames are generated such that one or more facial movements, e.g., lip movements, correspond to the CGR speech.

As represented by block 440c, in some implementations, the modified image data frames and audio data are provided to a rendering and display pipeline. For example, the speech synthesis device 106 (e.g., the modified video synthesizer 340) provides the modified image data frames to a rendering and display pipeline. In some implementations, as represented by block 440d, the method 400 includes transmitting the modified image data frames and audio data to another device. For example, as shown in FIG. 1, the speech synthesis device 106 transmits the modified image data frames to the client device 104. In some implementations, as represented by block 440e, the method 400 includes rendering the modified image data frames and audio data on a display in communication with the device. For example, the client device 104 shown in FIG. 1 displays the modified image data frames on a display of the client device 104 and renders the audio data on a speaker of the client device 104.

Figure 5:
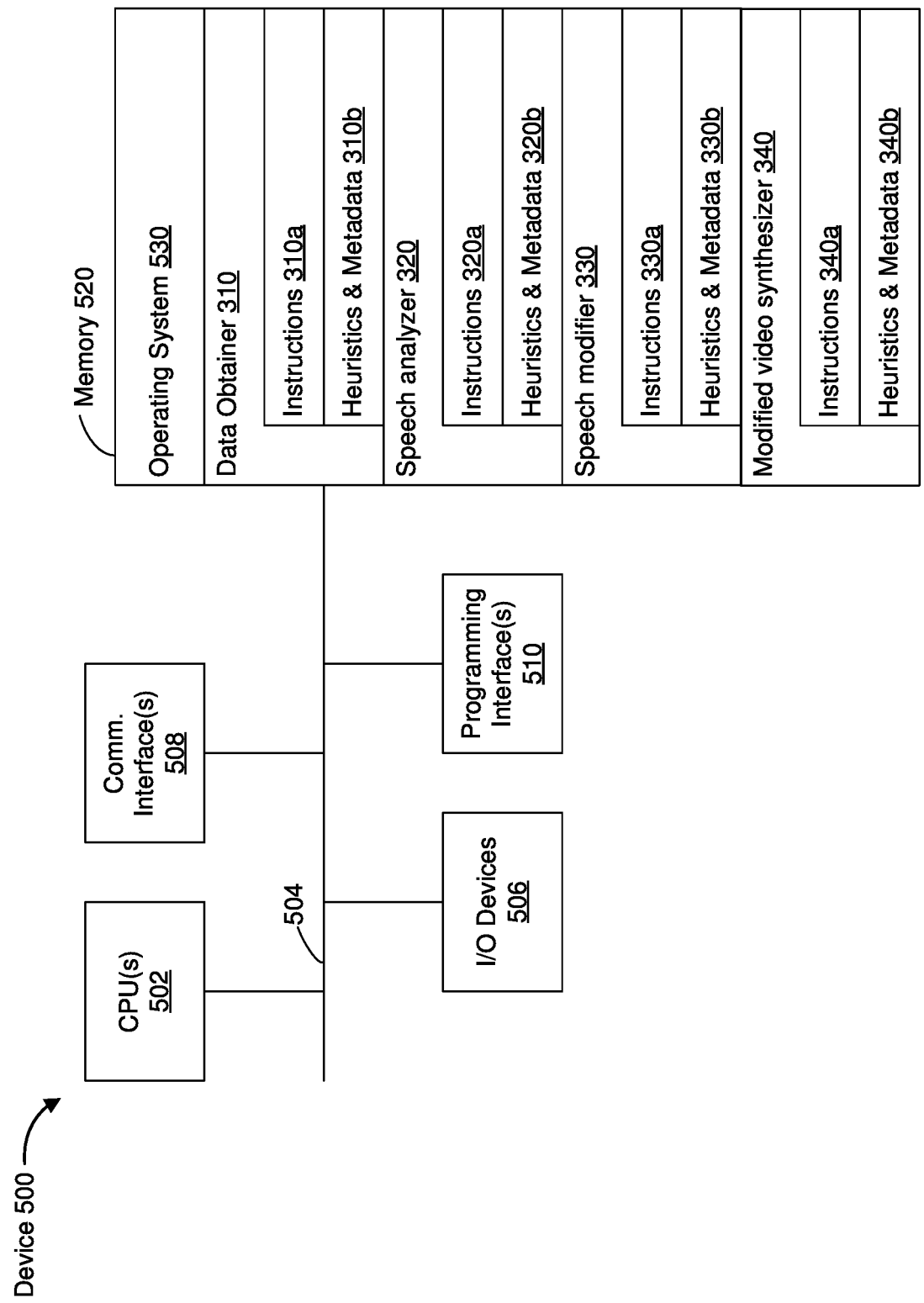
FIG. 5 is a block diagram of a device that synthesizes virtual speech in accordance with some implementations.

FIG. 5 is a block diagram of a device 500 (e.g., the speech synthesis device 106 shown in FIGS. 1 and 3) that synthesizes CGR speech in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations, the device 500 includes one or more processing units 502 (e.g., microprocessors, application-specific integrated-circuits (ASICs), field-programmable gate arrays (FPGAs), graphics processing units (GPUs), central processing units (CPUs), processing cores, and/or the like), one or more input/output (I/O) devices 506, one or more communication interfaces 508 (e.g., universal serial bus (USB), FIREWIRE, THUNDERBOLT, IEEE 802.3x, IEEE 802.11x, IEEE 802.16x, global system for mobile communications (GSM), code division multiple access (CDMA), time division multiple access (TDMA), global positioning system (GPS), infrared (IR), BLUETOOTH, ZIGBEE, and/or the like type interface), one or more programming (e.g., I/O) interfaces 510, a memory 520, and one or more communication buses 504 for interconnecting these and various other components.

In some implementations, the one or more communication buses 504 include circuitry that interconnects and controls communications between system components. In some implementations, the one or more I/O devices 506 include at least one of a keyboard, a mouse, a touchpad, a joystick, one or more microphones, one or more speakers, one or more image sensors (e.g., one or more cameras, for example, a front-facing camera), one or more displays (e.g., one or more CGR displays), and/or the like.

The memory 520 may include high-speed random-access memory, such as dynamic random-access memory (DRAM), static random-access memory (SRAM), double-data-rate random-access memory (DDR RAM), or other random-access solid-state memory devices. In some implementations, the memory 520 includes non-volatile memory, such as one or more magnetic disk storage devices, optical disk storage devices, flash memory devices, or other non-volatile solid-state storage devices. The memory 520 optionally includes one or more storage devices remotely located from the one or more processing units 502. The memory 520 comprises a non-transitory computer readable storage medium. In some implementations, the memory 520 or the non-transitory computer readable storage medium of the memory 520 stores the following programs, modules and data structures, or a subset thereof including an optional operating system 530, the data obtainer 310, the speech analyzer 320, the speech modifier 330, and the modified video synthesizer 340.

The operating system 530 includes procedures for handling various basic system services and for performing hardware dependent tasks.

As described herein, in various implementations, the data obtainer 310 obtains (e.g., receives or retrieves) speech input, which may be included in audio data (e.g., the audio data 118 shown in FIGS. 1 and 3). The audio data may be part of video data (e.g., the video data 108 shown in FIGS. 1 and 3). To that end, the data obtainer 310 includes instructions 310a and heuristics and metadata 310b. As described herein, in various implementations, the speech analyzer 320 analyzes the audio data 118 obtained by the data obtainer 310. To that end, the speech analyzer 320 includes instructions 320a and heuristics and metadata 320b. As described herein, in various implementations, the speech modifier 330 modifies the speech input (e.g., the speech input 322 shown in FIG. 3) based on one or more language characteristic values (e.g., the one or more language characteristic values 126 shown in FIGS. 1 and 3) to generate CGR speech output (e.g., the CGR speech output 332 shown in FIG. 3). To that end, the speech modifier 330 includes instructions 330a and instructions and heuristics 330b. As described herein, in various implementations, the modified video synthesizer 340 synthesizes modified video data (e.g., the modified video data 140 shown in FIGS. 1 and 3) based on the CGR speech output. To that end, the modified video synthesizer 340 includes instructions 340a and instructions and heuristics 340b.

Although the data obtainer 310, the speech analyzer 320, the speech modifier 330, and the modified video synthesizer 340 are shown as residing on a single device (e.g., the speech synthesis device 106), it should be understood that in other implementations, any combination of the data obtainer 310, the speech analyzer 320, the speech modifier 330, and the modified video synthesizer 340 may be located in separate computing devices.

Moreover, FIG. 5 is intended more as functional description of the various features which be present in a particular implementation as opposed to a structural schematic of the implementations described herein. As recognized by those of ordinary skill in the art, items shown separately could be combined and some items could be separated. For example, some functional blocks shown separately in FIG. 5 could be implemented as a single block and the various functions of single functional blocks could be implemented by one or more functional blocks in various implementations. The actual number of blocks and the division of particular functions and how features are allocated among them will vary from one implementation to another and, in some implementations, depends in part on the particular combination of hardware, software, and/or firmware chosen for a particular implementation.

Various processes defined herein consider the option of obtaining and utilizing a user's personal information. For example, such personal information may be utilized in order to provide an improved privacy screen on an electronic device. However, to the extent such personal information is collected, such information should be obtained with the user's informed consent. As described herein, the user should have knowledge of and control over the use of their personal information.

Personal information will be utilized by appropriate parties only for legitimate and reasonable purposes. Those parties utilizing such information will adhere to privacy policies and practices that are at least in accordance with appropriate laws and regulations. In addition, such policies are to be well-established, user-accessible, and recognized as in compliance with or above governmental/industry standards. Moreover, these parties will not distribute, sell, or otherwise share such information outside of any reasonable and legitimate purposes.

Users may, however, limit the degree to which such parties may access or otherwise obtain personal information. For instance, settings or other preferences may be adjusted such that users can decide whether their personal information can be accessed by various entities. Furthermore, while some features defined herein are described in the context of using personal information, various aspects of these features can be implemented without the need to use such information. As an example, if user preferences, account names, and/or location history are gathered, this information can be obscured or otherwise generalized such that the information does not identify the respective user.

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

It will also be understood that, although the terms "first," "second," etc. may be used herein to describe various elements, these elements should not be limited by these terms. These terms are only used to distinguish one element from another.

The terminology used herein is for the purpose of describing particular implementations only and is not intended to be limiting of the claims. As used in the description of the implementations and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

What is claimed is:

1. A method comprising:
    at a device including a display, an audio sensor, a non-transitory memory and one or more processors coupled with the non-transitory memory:
        displaying, on the display, a computer-generated reality (CGR) representation of a fictional character in a CGR environment; and
        assisting a user of the device in portraying the fictional character by:
            receiving, via the audio sensor, a speech input from the user;
            determining whether or not a speech characteristic of the speech input from the user matches a target speech characteristic associated with the fictional character;
            in response to determining that the speech characteristic of the speech input from the user does not match the target speech characteristic associated with the fictional character, modifying the speech input from the user based on the target speech characteristic associated with the fictional character in order to generate a modified speech input with a speech characteristic that matches the target speech characteristic associated with the fictional character; and
            outputting the modified speech input in the CGR environment via the CGR representation of the fictional character.

2. The method of claim 1, further comprising displaying, on the display, an indication that the speech input has been modified to match the target speech characteristic associated with the fictional character.

3. The method of claim 2, wherein the indication specifies a type of modification that has been made to the speech input.

4. The method of claim 2, wherein the indication specifies the modified speech input.

5. The method of claim 1, wherein modifying the speech input comprises deleting a phrase from the speech input to match a set of phrases spoken by the fictional character.

6. The method of claim 1, wherein modifying the speech input comprises adding a phrase to the speech input to match a set of phrases spoken by the fictional character.

7. The method of claim 1, wherein modifying the speech input comprises replacing a first phrase of the speech input with a second phrase to match a set of phrases spoken by the fictional character.

8. The method of claim 1, wherein modifying the speech input comprises modifying a tone of the speech input to match an intonation of the fictional character.

9. The method of claim 1, wherein the target speech characteristic indicates a location associated with the fictional character; and
    wherein modifying the speech input comprises modifying the speech input such that the modified speech input matches a speaking style of the location associated with the fictional character.

10. The method of claim 1, further comprising generating a modified image data frame based on the modified speech input such that a movement of a facial feature of the CGR representation of the fictional character is consistent with the modified speech input.

11. The method of claim 1, wherein determining whether or not the speech characteristic of the speech input from the user matches the target speech characteristic associated with the fictional character comprises determining whether or not an intonation associated with the speech input matches an intonation of the fictional character; and
    wherein modifying the speech input comprises modifying the intonation associated with the speech input to generate the modified speech input with an intonation that matches the intonation of the fictional character.

12. The method of claim 1, wherein determining whether or not the speech characteristic of the speech input from the user matches the target speech characteristic associated with the fictional character comprises determining whether or not a talking speed associated with the speech input matches a talking speed of the fictional character; and
    wherein modifying the speech input comprises modifying the talking speed associated with the speech input to generate the modified speech input with a talking speed that matches the talking speed of the fictional character.

13. The method of claim 1, wherein determining whether or not the speech characteristic of the speech input from the user matches the target speech characteristic associated with the fictional character comprises determining whether or not a set of phrases included in the speech input matches a set of phrases spoken by the fictional character; and
    wherein modifying the speech input comprises modifying the set of phrases included in the speech input to generate the modified speech input with a set of phrases that matches the set of phrases spoken by the fictional character.

14. The method of claim 1, wherein determining whether or not the speech characteristic of the speech input from the user matches the target speech characteristic associated with the fictional character comprises determining whether or not an accent associated with the speech input matches an accent of the fictional character; and wherein modifying the speech input comprises modifying the accent associated with the speech input to generate the modified speech input with an accent that matches the accent of the fictional character.

15. A device comprising:
one or more processors;
a display;
an audio sensor;
a non-transitory memory; and
one or more programs stored in the non-transitory memory, which, when executed by the one or more processors, cause the device to:
display, on the display, a computer-generated reality (CGR) representation of a fictional character in a CGR environment; and
assist a user of the device in portraying the fictional character by causing the device to:
receive, via the audio sensor, a speech input from the user;
determine whether or not a speech characteristic of the speech input from the user matches a target speech characteristic associated with the fictional character;
in response to determining that the speech characteristic of the speech input from the user does not match the target speech characteristic associated with the fictional character, modify the speech input from the user based on the target speech characteristic associated with the fictional character in order to generate a modified speech input with a speech characteristic that matches the target speech characteristic associated with the fictional character; and
output the modified speech input in the CGR environment via the CGR representation of the fictional character.

16. The device of claim 15, wherein the one or more programs further cause the device to display, on the display, an indication that the speech input has been modified based on the target speech characteristic associated with the fictional character.

17. The device of claim 16, wherein the indication specifies a type of modification that has been made to the speech input.

18. The device of claim 16, wherein the indication specifies the modified speech input.

19. The device of claim 15, wherein modifying the speech input comprises deleting a phrase from the speech input to match a set of phrases spoken by the fictional character.

20. The device of claim 15, wherein modifying the speech input comprises adding a phrase to the speech input to match a set of phrases spoken by the fictional character.

21. The device of claim 15, wherein modifying the speech input comprises replacing a first phrase of the speech input with a second phrase to match a set of phrases spoken by the fictional character.

22. The device of claim 15, wherein modifying the speech input comprises modifying a tone of the speech input to match an intonation of the fictional character.

23. The device of claim 15, wherein the target speech characteristic indicates a location associated with the fictional character; and
wherein modifying the speech input comprises modifying the speech input based on the location such that the modified speech input matches a speaking style of the location associated with the fictional character.

24. A non-transitory memory storing one or more programs, which, when executed by one or more processors of a device, cause the device to
display, on a display, a computer-generated reality (CGR) representation of a fictional character in a CGR environment; and
assist a user of the device in portraying the fictional character by causing the device to:
receive, via an audio sensor, a speech input from the user;
determine whether or not a speech characteristic of the speech input from the user matches a target speech characteristic associated with the fictional character;
in response to determining that the speech characteristic of the speech input from the user does not match the target speech characteristic associated with the fictional character, modify the speech input based on the target speech characteristic associated with the fictional character in order to generate a modified speech input with a speech characteristic that matches the target speech characteristic associated with the fictional character;
output the modified speech input in the CGR environment via the CGR representation of the fictional character; and
output a visual indication of a type of modification that was made to the speech input in order to generate the modified speech input.

25. The non-transitory memory of claim 24, further comprising displaying, on the display, an indication that the speech input has been modified to match the target speech characteristic associated with the fictional character.

26. The non-transitory memory of claim 24, wherein modifying the speech input comprises replacing a first phrase of the speech input with a second phrase to match a set of phrases spoken by the fictional character.

27. The non-transitory memory of claim 24, wherein modifying the speech input comprises modifying a tone of the speech input to match an intonation of the fictional character.

* * * * *